United States Patent
Cenanovic et al.

(10) Patent No.: US 10,863,451 B2
(45) Date of Patent: Dec. 8, 2020

(54) METHOD FOR CONTROLLING A TRANSMISSION POWER FOR A RADIO CONNECTION THAT STARTS FROM A MOTOR VEHICLE, CONTROL DEVICE FOR A MOTOR VEHICLE, AND MOTOR VEHICLE HAVING A CONTROL DEVICE

(71) Applicant: AUDI AG, Ingolstadt (DE)

(72) Inventors: Amir Cenanovic, Hepberg (DE); Lars Reichardt, Wettstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/626,009

(22) PCT Filed: Aug. 31, 2018

(86) PCT No.: PCT/EP2018/073473
§ 371 (c)(1),
(2) Date: Dec. 23, 2019

(87) PCT Pub. No.: WO2019/048351
PCT Pub. Date: Mar. 14, 2019

(65) Prior Publication Data
US 2020/0351796 A1    Nov. 5, 2020

(30) Foreign Application Priority Data
Sep. 8, 2017   (DE) .................. 10 2017 215 864

(51) Int. Cl.
*H04W 4/48* (2018.01)
*H04W 52/28* (2009.01)
(Continued)

(52) U.S. Cl.
CPC ........ *H04W 52/283* (2013.01); *H01Q 1/3291* (2013.01); *H04W 52/367* (2013.01)

(58) Field of Classification Search
USPC ....................... 455/440, 569.2, 69
See application file for complete search history.

(56) References Cited

U.S. PATENT DOCUMENTS

| 5,467,022 A | 11/1995 | Aoki et al. |
| 6,335,684 B1 | 1/2002 | Eisenmann et al. |
| (Continued) | | |

FOREIGN PATENT DOCUMENTS

| DE | 2402028 A1 | 7/1975 |
| DE | 4301000 C2 | 7/1993 |
| (Continued) | | |

OTHER PUBLICATIONS

International Preliminary Report on Patentability directed to related International Patent Application No. PCT/EP2018/073473, completed Jul. 26, 2019, with attached English-language translation; 11 pages.

(Continued)

*Primary Examiner* — Tu X Nguyen
(74) *Attorney, Agent, or Firm* — Sterne, Kessler, Goldstein & Fox P.L.L.C.

(57) ABSTRACT

The disclosure relates to a method for controlling a transmission power for a radio connection from at least one interior antenna of a motor vehicle to at least one radio device outside of the vehicle. At least one seat occupancy sensor of the motor vehicle signals seat occupancy of an associated vehicle seat by means of an associated occupancy signal. The transmission power at the at least one interior antenna is controlled in accordance with the occupancy signal. The disclosure further relates to a control device and to a motor vehicle having such a control device.

9 Claims, 4 Drawing Sheets

(51) Int. Cl.
*H01Q 1/32* (2006.01)
*H04W 52/36* (2009.01)

(56) References Cited

U.S. PATENT DOCUMENTS

| | | |
|---|---|---|
| 9,681,393 B2 | 6/2017 | Mohlmann et al. |
| 2006/0092023 A1 | 5/2006 | Hofbeck et al. |
| 2016/0001728 A1 | 1/2016 | Schrabler et al. |

FOREIGN PATENT DOCUMENTS

| | | |
|---|---|---|
| DE | 19812626 A1 | 9/1999 |
| DE | 19852239 A1 | 5/2000 |
| DE | 10044366 B4 | 4/2002 |
| DE | 10258805 A1 | 8/2004 |
| DE | 102004050884 B3 | 4/2006 |
| DE | 102013201836 A1 | 8/2014 |
| EP | 2529981 A1 | 12/2012 |
| EP | 2830369 A1 | 1/2015 |
| WO | WO 2017106816 A1 | 6/2017 |

OTHER PUBLICATIONS

International Search Report and Written Opinion of the International Searching Authority directed to related International Patent Application No. PCT/EP2018/073473, with attached English-language translation, issued Dec. 20, 2018; 19 pages.

Fig. 4

METHOD FOR CONTROLLING A TRANSMISSION POWER FOR A RADIO CONNECTION THAT STARTS FROM A MOTOR VEHICLE, CONTROL DEVICE FOR A MOTOR VEHICLE, AND MOTOR VEHICLE HAVING A CONTROL DEVICE

TECHNICAL FIELD

The disclosure relates to a method for controlling a transmission power for a radio connection that starts from a motor vehicle from at least one antenna of the motor vehicle to a vehicle-external radio device.

BACKGROUND

The number of antennas required in a motor vehicle increases with the requirements for connectivity or connections of motor vehicles to other devices via outbound radio connections, for example via wireless standards such as Bluetooth, wireless local area network (WLAN), LTE (long term evolution) or other mobile methods. An outwardly directed radio connection is thus generally a mobile radio connection from the motor vehicle to a vehicle-external radio device, such as a mobile radio mast or a WLAN connection of the motor vehicle with a vehicle-external device, such as in a known, so-called car-to-X communication. In order to ensure optimal emission of such a transmission signal, antennas are often mounted on an external surface of the motor vehicle, such as a roof or a bumper. The disadvantage of roof antennas, however, is that on the one hand no roof antennas can be mounted on convertibles or similar vehicles without a roof, and on the other hand roof antennas can be damaged by their protruding shape. The risk of damage exists in particular with antennas which are mounted on a bumper. Furthermore, not enough installation space on the vehicle roof or the bumpers is available for the required number of antennas.

It would also be possible to position an antenna in an interior of a motor vehicle since it would also protect it from accidents and thus be more crash-proof, such that it could send a transmission signal, at least in certain cases, even after an accident of the motor vehicle. However, it can be seen that, as a result of interior antennas, a passenger or occupant of the motor vehicle may be exposed to stronger electromagnetic radiation and thus to higher radiation exposure when transmitting a transmission signal for one of the outwardly directed radio connections described above than when using outside antennas. For an outward radio connection, certain signal strengths of the transmission signal are therefore necessary. However, legally prescribed SAR values (SAR for "specific absorption rate") must be complied with in order to ensure that a passenger or occupant is not exposed to excessive electromagnetic field strengths or that the radiation exposure is too high due to the signal strength. Therefore, in motor vehicles, the use of interior antennas for transmitting radio signals to vehicle-external radio devices is contemplated to ensure a radiation exposure for an occupant below a predetermined limit or to maintain predetermined SAR values in the passenger compartment.

WO 2017/106816 A1 discloses a charging system by means of which a smartphone can recharge energy in a motor vehicle. The energy is wirelessly transmitted as a radio signal by an array of antennas directing beams to the smartphone, which then hit directly or indirectly on an antenna of the smartphone. The position of vehicle passengers can be detected by means of seat occupancy sensors and the directional beams can be aligned in a targeted manner, avoiding occupied seats. This should avoid an unnecessary radiation exposure of people and an unnecessary loss of energy.

DETAILED DESCRIPTION

The disclosure relates to a method for controlling a transmission power for a radio connection that starts from a motor vehicle from at least one antenna of the motor vehicle to a vehicle-external radio device. The disclosure further relates to a control device and a motor vehicle having at least one antenna and a control device according to the disclosure.

The number of antennas required in a motor vehicle increases with the requirements for connectivity or connections of motor vehicles to other devices via outbound radio connections, for example via wireless standards such as Bluetooth, wireless local area network (WLAN), LTE (long term evolution) or other mobile methods. An outwardly directed radio connection is thus generally a mobile radio connection from the motor vehicle to a vehicle-external radio device, such as a mobile radio mast or a WLAN connection of the motor vehicle with a vehicle-external device, such as in a known, so-called car-to-X communication. In order to ensure optimal emission of such a transmission signal, antennas are often mounted on an external surface of the motor vehicle, such as a roof or a bumper. The disadvantage of roof antennas, however, is that on the one hand no roof antennas can be mounted on convertibles or similar vehicles without a roof, and on the other hand roof antennas can be damaged by their protruding shape. The risk of damage exists in particular with antennas which are mounted on a bumper. Furthermore, not enough installation space on the vehicle roof or the bumpers is available for the required number of antennas.

It would also be possible to position an antenna in an interior of a motor vehicle since it would also protect it from accidents and thus be more crash-proof, such that it could send a transmission signal, at least in certain cases, even after an accident of the motor vehicle. However, it can be seen that, as a result of interior antennas, a passenger or occupant of the motor vehicle may be exposed to stronger electromagnetic radiation and thus to higher radiation exposure when transmitting a transmission signal for one of the outwardly directed radio connections described above than when using outside antennas. For an outward radio connection, certain signal strengths of the transmission signal are therefore necessary. However, legally prescribed SAR values (SAR for "specific absorption rate") must be complied with in order to ensure that a passenger or occupant is not exposed to excessive electromagnetic field strengths or that the radiation exposure is too high due to the signal strength. Therefore, in motor vehicles, the use of interior antennas for transmitting radio signals to vehicle-external radio devices is contemplated to ensure a radiation exposure for an occupant below a predetermined limit or to maintain predetermined SAR values in the passenger compartment.

WO 2017/106816 A1 discloses a charging system by means of which a smartphone can recharge energy in a motor vehicle. The energy is wirelessly transmitted as a radio signal by an array of antennas directing beams to the smartphone, which then hit directly or indirectly on an antenna of the smartphone. The position of vehicle passengers can be detected by means of seat occupancy sensors and the directional beams can be aligned in a targeted manner, avoiding occupied seats. This should avoid an unnecessary radiation exposure of people and an unnecessary loss of energy.

The object of the disclosure is to arrange an antenna for an outwardly directed radio connection with high crash safety in a motor vehicle and thereby to control a transmission power of the antenna such that a radiation exposure of an occupant of the motor vehicle caused by a radio signal originating from the antenna does not exceed a predetermined value.

The object is achieved according to the independent claims of the application. Advantageous developments of the disclosure are described in the dependent claims, the following description and the figures.

The disclosure provides for a method for setting a transmission power for a radio connection starting from at least one antenna of a motor vehicle to at least one vehicle-external radio device. This means that, according to the method, a transmission power is set or controlled for, for example, a mobile radio connection between the motor vehicle and a mobile mast. Thus, a mobile telephone connection via the associated antenna of the motor vehicle can be established via a car telephone or a smartphone connected to an on-board computer of the motor vehicle. The car telephone/smartphone can generate a specific signal for this, which is radiated by the associated antenna of the motor vehicle such that it can be received by the mobile phone mast. In this case, the signal strength of the transmission signal radiated by the associated antenna can be set or controlled by setting the corresponding transmission power at the associated antenna or its feed-in point. It is for example possible to set a transmission power higher when the mobile mast is located at a greater distance from the motor vehicle, than when it is located at a lower distance from the motor vehicle.

The disclosure initially provides that the at least one antenna is in each case an interior antenna or, in each case, an interior antenna is used as the at least one antenna.

According to the method, in a method step, at least one seat occupancy sensor of the motor vehicle signals seat occupancy of an associated vehicle seat or seat position by means of an associated occupancy signal. This means that it is checked by means of one or more seat occupancy sensors, whether there is an occupant on one or more vehicle seats in the motor vehicle. In order to recognize this, methods or devices from the prior art for recognizing occupancy of a seat are known. In this case, for example, each vehicle seat can have such a known sensor or an associated sensor can be provided for each seat position on a rear bench of the motor vehicle.

Any other types of seat occupancy sensors can also be used in the method according to the disclosure, for example optical detection by a camera in the interior of the motor vehicle. For example, a seat occupancy sensor outputs a first occupancy signal having a first value related to an occupied driver's seat or a seat position, and outputs a second occupancy signal having a second value related to an unoccupied driver's seat or a seat position. The occupancy signal thus contains information about which seats of the motor vehicle are occupied by occupants.

According to the disclosure, the associated transmission power at the at least one interior antenna of the motor vehicle is controlled as a function of the occupancy signal. In the claimed method, an interior antenna is used as the transmitting antenna of the motor vehicle for the radio connection to a vehicle-external radio device. An interior antenna is such an antenna mounted in an interior or a driver's cabin or a passenger compartment of the motor vehicle. For example, an interior antenna may be positioned between an interior trim panel and a vehicle roof, or may be positioned between an interior trim panel and a vehicle door. An interior antenna may for example also be positioned on a windshield or on another vehicle window of the motor vehicle or be positioned, for example, on a rear parcel shelf of the motor vehicle. An interior antenna is thus generally characterized in that it is arranged in the same region of the passenger compartment of the motor vehicle, in which occupants or passengers of the motor vehicle are located, such that there is a high crash safety for this interior antenna. In the method, such interior antennas of a motor vehicle are thus used not only for receiving, but also for transmitting radio signals.

In order to provide the radio connection from the at least one interior antenna to a vehicle-external radio device, an associated radio signal is provided or applied to the associated interior antenna. This radio signal can be varied in its signal strength. The transmission power on the interior antenna determines the strength of an electromagnetic field strength of the radio signal or transmission signal radiated from the interior antenna and thus the strength of a radiation load at a certain distance from the interior antenna.

By the method, this transmission power provided on the interior antenna is controlled as a function of the occupancy signal. This may mean, for example, that when the occupancy signal indicates that a passenger is in the driver's seat of the motor vehicle, the transmission power is completely switched off, i.e. no signal is radiated, and then, if there are no passengers or occupants in the vehicle, one full transmission power is set. It is also possible that when the occupancy signal indicates that only one driver is in the motor vehicle, the transmission power is controlled to a first value and then when the occupancy signal indicates that all seats of the motor vehicle are occupied, the transmission signal the transmission power is controlled to a second value.

The advantage here is that an interior antenna of a motor vehicle can be used to provide a radio connection to a vehicle-external radio device by using the interior antenna as a transmitting antenna. By controlling the transmission power as a function of the occupancy signal, i.e. an occupancy of the seats of the motor vehicle, it is possible to control the transmission power such that a radiation exposure of occupants of the motor vehicle remains below a predetermined limit. Thus, advantageously, the interior antenna can approximately establish a wireless connection or operate at full transmission power when no passenger or occupant is currently is in the vehicle, since in this case no occupant is exposed to radiation exposure. If an occupant is in the motor vehicle, the transmission power can be controlled such that a radiation exposure at exactly the seat on which the associated occupant sits, does not exceed the predetermined limit. Thus, it is possible to arrange antennas in a motor vehicle on the one hand to be crash-proof and on the other hand to ensure that a radiation exposure of a vehicle occupant does not exceed a predetermined limit. Interior antennas continue to offer cost advantages as they are less robust and lighter in weight than outdoor antennas.

In the method, it is provided that the transmission power is reduced at the associated interior antenna depending on a distance of a vehicle seat or seat position with a signaled seat occupancy to an associated interior antenna. The transmission power can be reduced gradually, stepwise or continuously. Both a full reduction to a transmission power of zero watts/no transmission power/no transmission of a radio signal is possible, as well as a gradual reduction or a gradual dimming or reducing of the transmission power. It is therefore provided that at least one interior antenna is used, each vehicle seat of the motor vehicle being at a certain distance from this interior antenna. An interior antenna may for example be attached to a parcel shelf of the motor vehicle such that it has a first distance from a seat in the back of the motor vehicle and has a second distance from a driver's seat of the motor vehicle. If, in this case, the occupancy signal now signals that the driver's seat is occupied, the transmission power of this interior antenna can be set to a first value. If the occupancy signal indicates that a seat in the back seat is occupied, the transmission power of the interior antenna can be set to a second value which is lower than the first value, since the rear seat is positioned closer to the interior antenna, such that a radiation exposure at the same transmission power would be higher there than at the driver's seat. The advantage here is that whenever only the driver's seat is occupied, a transmission power can be set higher due to the higher distance or the larger gap between the driver and the interior antenna on the rear parcel shelf, without a radiation exposure of the driver exceeding the predetermined value. On the other hand, if occupants sit in the back seat, the transmission power can be reduced or lowered, wherein the reducing or lowering of the transmission power can be gradual or continuous, such that the radiation exposure of the occupants in the back seat does not exceed the predetermined limit. This results in the advantage that via the interior antenna a transmission signal or radio signal can always be sent with the greatest possible signal strength or a maximum transmission power to ensure the best possible wireless connection. The distance to an associated interior antenna need not be uniform or concentric around the interior antenna, it may also depend on a directivity or antenna characteristic of the associated interior antenna. For example, it is possible for an interior antenna to be positioned in the middle of the rear parcel shelf of the motor vehicle, with a transmission power being greatly reduced on the basis of the antenna characteristic when the center seat of the rear seat of the motor vehicle is occupied, but the transmission power is set to the full value if a left or a right seat of the back seat is occupied, without a radiation exposure being too high. By the antenna characteristic, it is possible that a radiation load by a transmission signal from an interior antenna does not exceed the predetermined value even if a seat is located relatively close to the antenna but is located at a predetermined advantageous angle with respect to the antenna alignment. In this way, interior antennas can advantageously be arranged such that their transmission power does not have to be reduced when seat positions of the motor vehicle are occupied, which are occupied relatively frequently, as with a high probability, during a drive of the motor vehicle.

Further advantages of the disclosure will become apparent by further developments of the method according to the disclosure.

A further development of the method provides that when a seat occupancy is signaled within a predetermined safety distance of a first interior antenna, a corresponding switch of a transmission path is set such that the transmission power is fed into at least one interior antenna which is different from the first interior antenna and in which no corresponding seat occupancy is signaled within a predetermined distance. In other words, at least two interior antennas are arranged in the motor vehicle, which assume different distances at least with respect to a seat. For example, a first interior antenna can be arranged on the windshield of the motor vehicle in a vicinity of the driver's seat and a second interior antenna can be arranged on the rear parcel shelf of the motor vehicle. Now, if the occupancy signal indicates that the driver's seat is occupied, i.e. a seat occupancy is signaled within the predetermined safety distance of the first interior antenna on the windshield, a switch can be set such that the radio connection takes place via the second interior antenna, which is, for example, positioned on the rear parcel shelf. The first interior antenna is thus completely deactivated or switched off. The driver's seat is thus not within the predetermined safety distance to the second interior antenna in this case, such that the radiation exposure of the occupant in the driver's seat by the transmission signal, which is radiated from the second interior antenna, does not exceed the predetermined limit. The advantage of this development is that the interior antenna furthest away from all vehicle occupants of the motor vehicle can always be used for the radio connection, such that the highest possible transmission power can be applied to this interior antenna.

A development of the method provides that the transmission power is controlled by means of an adjustment of a transmission amplifier of a transmission path of an associated interior antenna. The signal strength of the radio signal which is radiated by the associated interior antenna depends on how much a transmission amplifier of the transmission path amplifies the signal to be radiated to which transmission path the associated interior antenna is connected. An adjustment of the signal strength and thus of the electromagnetic field strength radiated from the interior antenna can thus be adjusted by the associated transmission amplifier. If an occupancy signal signals an occupancy of a vehicle seat, thereby reducing transmission power, this can be done by a corresponding setting of the transmission amplifier, which correspondingly reduces an amplification. The advantage here is that with a lower power of the transmission amplifier this also has only a lower power consumption, such that not only the radiation exposure of the associated vehicle occupant does not exceed the predetermined limit by this setting, but at the same time a power consumption for each radio connection is kept low.

A development of the method provides that the transmission power is controlled by an associated insertion of an attenuator in a transmission path leading to the associated interior antenna. In this case, the adjustment may remain the same at a transmission amplifier of the transmission path and the radiated electromagnetic field strength may be reduced by inserting a corresponding attenuator in the transmission path at which a part of the power of the signal applied to the interior antenna is dropped, such that the signal is not radiated at full power. The advantage of this is that this solution is particularly easy to carry out and even an existing transmission system can be easily retrofitted so that it can be operated according to the method.

In a further development, it is provided that the occupancy signal is either transmitted directly to a transmitting device, or an on-board computer transmits the occupancy signal to an associated transmitting device. Such a transmission device is designed to feed an associated transmission signal into an interior antenna of the motor vehicle, so that it is radiated from this interior antenna. It is therefore the transmission electronics. If the occupancy signal is transmitted directly to the transmitting device, there is the advantage that such a transmitting device with associated seat occupancy sensors can be retrofitted particularly easily in a motor vehicle and that a transmission power is reduced even if, for example, an error should be present in the onboard computer, since the occupancy signal is transmitted independently of another computing device to the transmitting device. If the occupancy signal is transmitted via an onboard computer to the associated transmitting device, there is the advantage that in this case already existing seat occupancy sensors can be used in a particularly simple manner for carrying out the method according to the disclosure.

A development of the method provides that the transmission power to be adjusted as a function of the associated occupancy signal is determined in a calibration step by at least one measurement of an electromagnetic field strength at at least one associated seat. The associated electromagnetic field strength results in the radiation exposure for an occupant sitting on the seat at which the measurement is carried out. It is thus determined in a measuring step, how much a transmission power can be adjusted by an interior antenna, so that at the associated measuring station/seat the radiation exposure does not exceed the predetermined limit. Advantageously, it can be determined how an associated transmission power can be set, so that precisely the predetermined limit value of the radiation exposure at the associated seat having an associated seat occupancy sensor is not exceeded. This ensures that the radio connection of very different vehicles with different interior antennas and passenger compartments can always be built with the highest possible transmission power.

In a development of the method, it is provided that the interior antenna used is a Bluetooth antenna and/or a WLAN antenna and/or a mobile radio antenna. This results in the advantage that the method according to the disclosure can be used for a large number of radio connections which can be set up by the motor vehicle with a vehicle-external radio device.

The disclosure also includes a control device for a motor vehicle, which is designed to control a transmission power on at least one antenna of the motor vehicle. The control device is designed to receive information about a seat occupancy of the motor vehicle from an associated sensor. The control device is configured to control an associated transmission power depending on the seat occupancy according to the described method. Such a control device can therefore perform the method according to the disclosure, if it is installed in a motor vehicle with an interior antenna and a seat occupancy sensor.

The disclosure further includes a motor vehicle with a control device according to the disclosure. The control device is bound with at least one interior antenna and at least one seat occupancy sensor of the motor vehicle. The control device can also be realized or designed by a central on-board computer of the motor vehicle. This results in the advantage that an existing computing device can perform the method according to the disclosure, so that no further hardware or electronic components are required in the motor vehicle.

The disclosure also includes further embodiments of the control device and the motor vehicle according to the disclosure, which embodiments have features such as those previously described in connection with the further embodiments of the process according to the disclosure. It is for this reason that the relevant further embodiments of the control device and the motor vehicle according to the disclosure are not described again herein.

Exemplary embodiments of the disclosure are described below.

Figure 1:
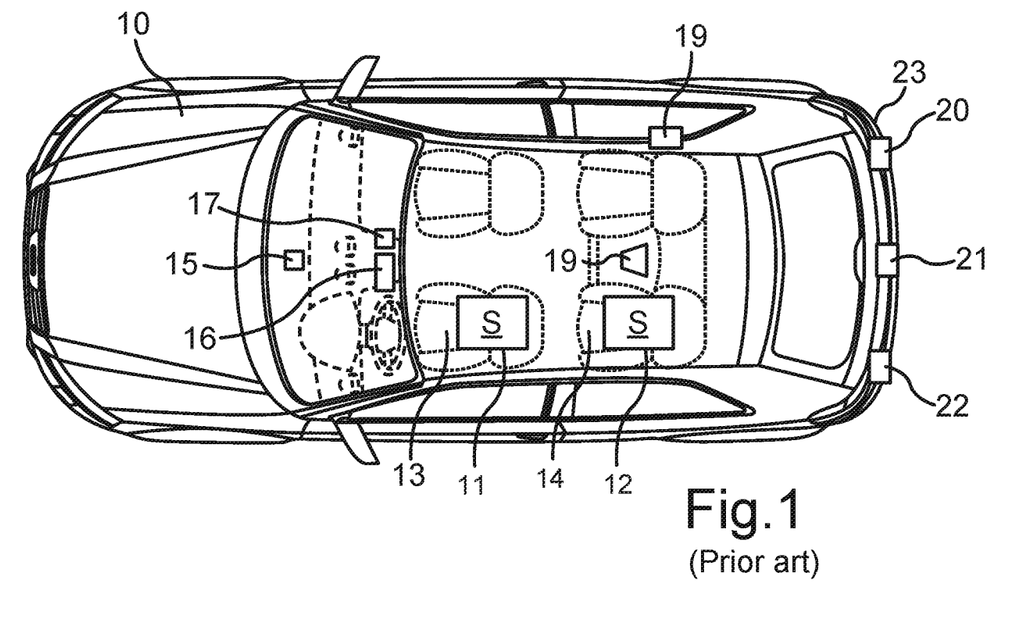
FIG. 1 shows a motor vehicle having different antennas and seat occupancy sensors according to the prior art.

FIG. 1 shows a motor vehicle having different antennas and seat occupancy sensors according to the prior art.

Figure 2:
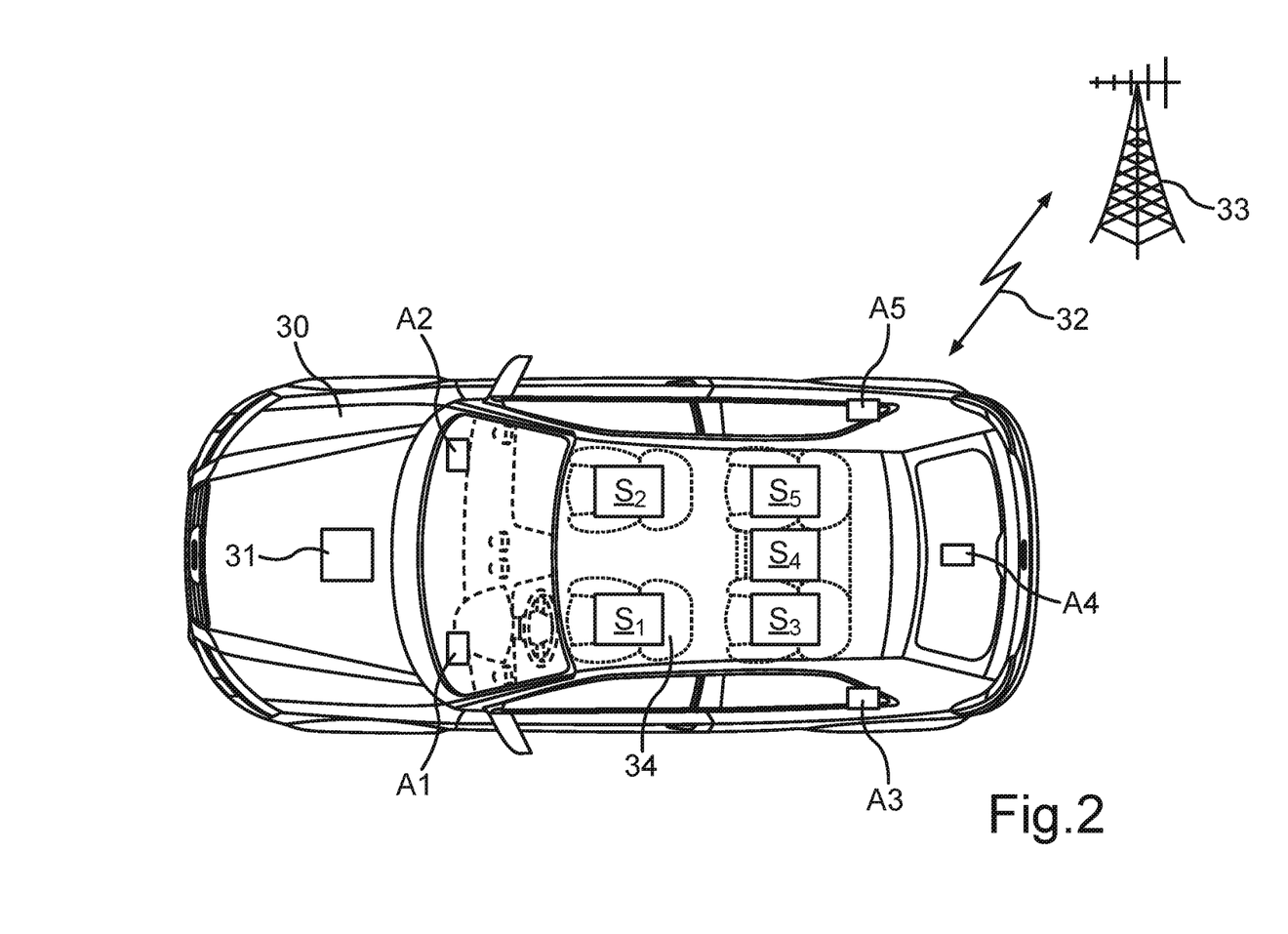
FIG. 2 shows a motor vehicle according to the disclosure having interior antennas, a control device and seat occupancy sensors.

FIG. 2 shows a motor vehicle according to the disclosure having interior antennas, a control device and seat occupancy sensors.

Figure 3:
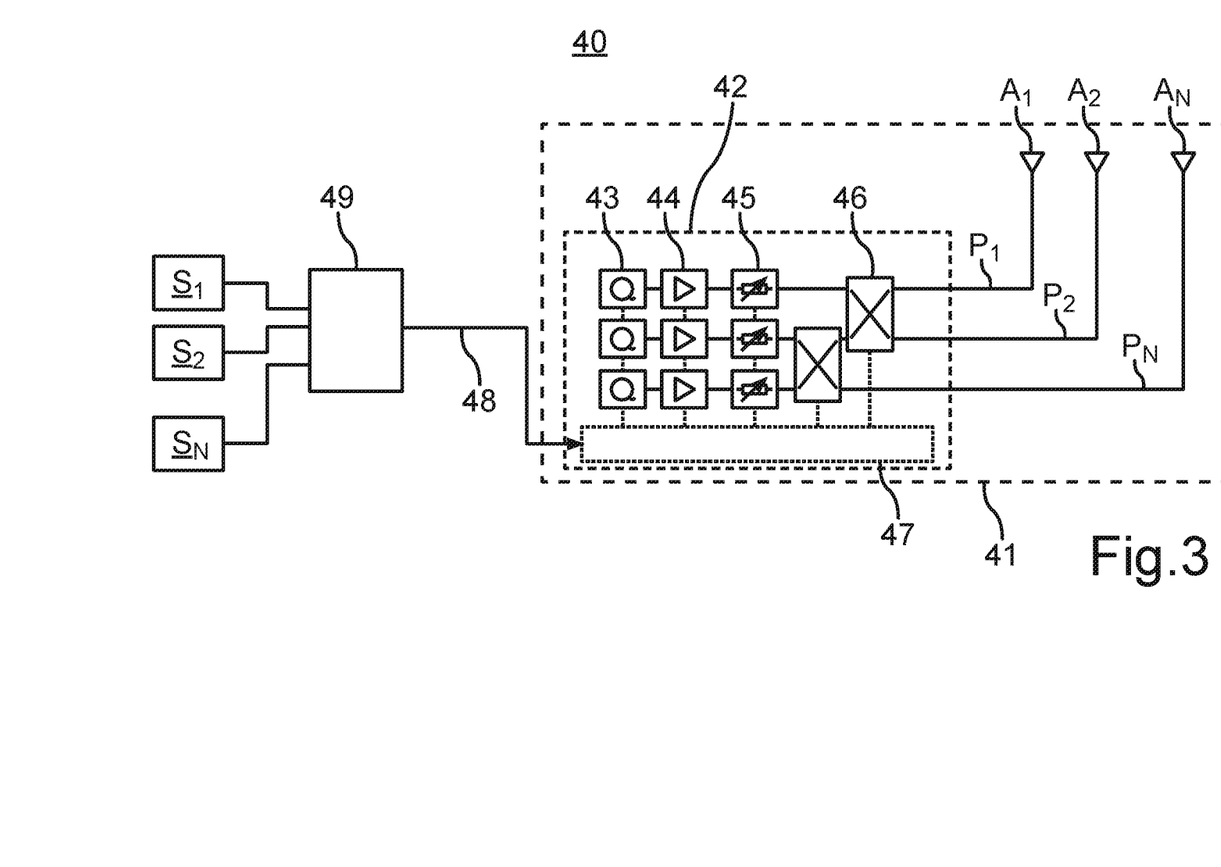
FIG. 3 shows a control device having seat occupancy sensors and interior antennas.

FIG. 3 shows a control device having seat occupancy sensors and interior antennas.

Figure 4:
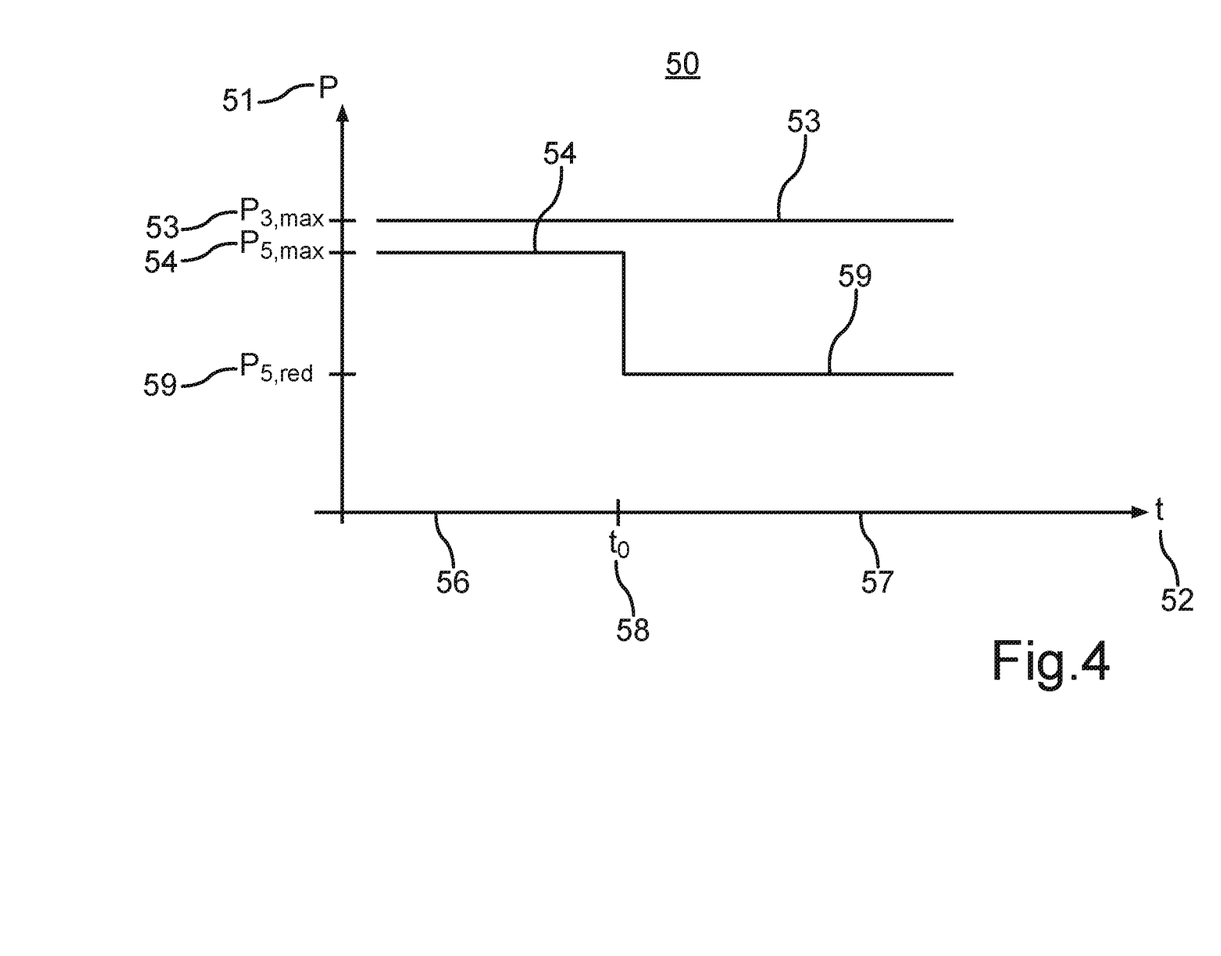
FIG. 4 shows a schematic diagram of an associated transmission power at two interior antennas as a function of a time course.

FIG. 4 shows a schematic diagram of an associated transmission power at two interior antennas as a function of a time course.

The exemplary embodiments described below are preferred embodiments of the disclosure. In the embodiments, the components of the embodiments that are described each constitute individual features of the disclosure to be considered in isolation, which individually also develop the disclosure in isolation and are thus also to be considered part of the disclosure both individually and in a combination that is different from the combination described. In addition, the embodiments described may also be supplemented by further features of the disclosure, which have already been described.

In the drawings, functionally identical elements are denoted with the same reference signs.

FIG. 1 shows a motor vehicle 10 known from the prior art having various radio antennas and vehicle seats 13, 14 equipped with seat occupancy sensors 11, 12. In this case, the motor vehicle 10 has antennas 15, 16, 17, 18, 19 positioned in an interior of the motor vehicle 10, which antennas are designed to receive radio signals. The motor vehicle 10 furthermore has antennas 20, 21, 22, which are located outside the vehicle interior and are arranged on a rear bumper 23 of the motor vehicle 10.

FIG. 2 shows a motor vehicle 30 according to the disclosure having interior antennas A1, A2, A3, A4, A5, a control device 31 and seat occupancy sensors S1, S2, S3, S4, and S5, which are each assigned to a vehicle seat. The seat occupancy sensor S1 is associated, for example, with the vehicle seat 34. The motor vehicle 30 can build or provide a radio connection 32 to an external radio 33 via one or more of the interior antennas. The external radio 33 is such a radio device, which is located outside the motor vehicle 30. It may for example be a WLAN device, which may be publicly accessible, for example in a parking lot or at a gas station, or a mobile phone mast.

Each of the antennas A1 to A5 has a certain distance to a vehicle seat or seat position designated by a seat occupancy sensor S1 to S5. The antenna A1 has, for example, a smaller distance to the vehicle seat 34 with seat occupancy sensor S1, as a seat with seat occupancy sensor S5. For example, only the vehicle seat with seat occupancy sensor S3 may be within a distance of antenna A3, in which a transmission power to A3 must be reduced when occupying the seat with S3.

FIG. 3 shows a control device 40 which has seat occupancy sensors S1, S2 to SN and interior antennas A1, A2 to AN. The interior antennas are part of a transmitting and receiving unit 41, and are each connected via a corresponding signal path P1, P2 to PN with a transmitting device 42. The transmitting device 42 has for each signal path a high-frequency signal source 43, a high-frequency amplifier 44 and an insertion member 45. Between each two signal paths, a high-frequency switch 46 may be provided. The transmitting device 42 has a control unit 47, by means of which the components of the transmitting device 42 are controlled. The control unit 47 is designed to receive an occupancy signal 48, which is generated by a sensor control 49. The sensor control generates the occupancy signal 48 as a function of the seat occupancy sensors S1, S2 to SN, so that information is transmitted in the occupancy signal 48 about which of the vehicle seats of the motor vehicle is occupied by the control device 40.

The sensors S1 to SN can be configured in a manner known per se. For example, DE 10 2013 201 836 A1 discloses a method and a device for detecting the presence of objects in a passenger compartment of a vehicle. The method offers an alternative to detection using seat mats or ultrasonic devices. For this purpose, electromagnetic signals are sent to the passenger compartment, reflected from existing objects, received again and finally evaluated in terms of an object property.

From EP 2 529 981 A1, it is known how an occupancy state of a seat can be detected. For this purpose, two adjacent antennas are mounted under the seat. In the presence of a proximal (human) body in a measurement, a characteristic change in the electromagnetic coupling of the antennas is captured and thus it is detected that the seat is occupied.

From DE 10 2004 050 884 B3, a seat occupancy recognition device is known. For this purpose, at least one transmitting device and at least one receiving device are arranged in a position in the seat at such a distance from the at least one transmitting device such that a person located on the seat is located at least partially in the signal path between the at least one transmitting device and the at least one receiving device for influencing the signals in dependence of the seat occupancy.

If a seat is occupied by S1, for example, a high-frequency switch 46 between P1 and P2 can be switched so that the radio signal to be radiated is radiated for a radio connection of A2. The seat with S2 is unoccupied in this application. It is alternatively or additionally possible to reduce a gain of the high-frequency amplifier 46, which is connected to A1 via P1, or to insert an insertion member 45 in P1 in order to reduce a signal strength radiated by Al.

FIG. 4 shows a schematic diagram 50 of an associated transmission power 51 at two interior antennas A3, A5 as a function of a time course 52. The interior antennas A3 and A5 correspond to the interior antennas of the motor vehicle 30 of FIG. 2. A maximum transmission power 53 can be applied to the interior antenna A3, and a maximum transmission power 54 to the interior antenna A5. In a first time period 56, the two vehicle seats of the motor vehicle 30 from FIG. 2 are unoccupied the seat occupancy sensors S3 and S5. In a second period 57, the vehicle seat with the seat occupancy sensor S3 is still unoccupied, but the vehicle seat with the seat occupancy sensor S5 is occupied. The two periods 56 and 57, separated by the time 58, at which an occupant sits on the vehicle seat with the seat occupancy sensor S5. In the period 56, a transmission power applied to the antenna A3 is the maximum transmission power 53 and a transmission power applied to the interior antennas A5 is the maximum transmission power 54. In the period 57, a radiation exposure of the additional occupant would exceed a predetermined limit by a maximum transmission power 54 which is still applied to the antenna A5. Therefore, according to the method, at the time 58 at which the vehicle occupant sits down on the seat with the seat occupancy sensor S5, a transmission power applied to the interior antennas A5 is reduced so that a reduced transmission power 59 is applied to the interior antennas A5 in the period 57. Thereby, it is possible to continue to use the antenna A5 and to keep a radiation load within a predetermined range.

According to a particularly preferred embodiment, antennas are provided in a motor vehicle, which can establish a radio connection to a vehicle-external radio device and which are crash-proof at the same time. The antennas can be used, for example, for vehicle-related emergency call services, since they continue to function, for example, even in the event of an accident of the motor vehicle. The antennas belonging to a transmitting and receiving unit can be remote or integrated antennas and are positioned in a vehicle interior. The transmitting and receiving unit is controlled via a sensor signal of a seat occupancy sensor such that a radiation exposure is minimized by a vehicle occupant on the associated seat of the seat occupancy sensor by electromagnetic fields emanating from the antenna, while the antenna function is maintained. Depending on a seat occupancy in the motor vehicle, a transmission power is controlled at an associated antenna feed-in point. By the seat occupancy sensor, it is detected whether a vehicle occupant is in the immediate vicinity, i.e. within a predetermined distance, of the built-in transmitting antenna or interior antennas. The sensor signal of the associated seat occupancy sensor is used as a trigger to control an associated high frequency component of the transmitter unit, wherein a high frequency component may be a source, a controllable amplifier, a controllable attenuator or a switch. This makes it possible to control the transmission power or, for example, to switch a transmission signal of a first path with a first antenna to a second path with a second antenna when no occupant is in the immediate vicinity of the second antenna. The advantages of the method according to the disclosure are that a radiation exposure of an occupant or an SAR value at a vehicle seat is reduced when an associated vehicle seat is occupied by the vehicle occupant. Thus, the radiation load is reduced to a minimum while maintaining an antenna function or the possibility of a radio connection. Further advantages are that antennas built-in in an interior of a motor vehicle lead to significant cost savings, since such antennas are in a dry area and not exposed to extreme environmental conditions such as on a bumper. Furthermore, interior antennas are so built that they are not visible and at the same time they are protected against vandalism. In particular, there is no noticeable financial overhead due to the seat occupancy sensors, since there are known cost-effective solutions and/or seat occupancy sensors are already installed in many vehicles, which can be reused according to the method. Interior antennas continue to have a lower weight than corresponding roof antennas or bumper antennas, so that a vehicle weight can be reduced.

Overall, the examples show how an interior antenna can also be used by the disclosure as a transmitting antenna to establish a radio connection to a vehicle-external radio device, whereas a radiation exposure of occupants of the motor vehicle is kept below a predetermined limit. For this purpose, according to the disclosure, a transmission power applied to an interior antenna is controlled as a function of a seat occupancy of the motor vehicle.

The invention claimed is:

1. A method for controlling a transmission power for a radio connection from an antenna of a motor vehicle to a radio device, wherein the antenna is an interior antenna, the method comprising:

determining, by a seat occupancy sensor of a control device, an occupancy signal of an vehicle seat based on a seat occupancy;

controlling, by a control device of the motor vehicle, the transmission power at the interior antenna in accordance with the occupancy signal; and reducing, by the control device of the motor vehicle, the transmission power at the interior antenna stepwise or continuously as a function of a distance between the vehicle seat or a position of the vehicle seat and the interior antenna, wherein the vehicle seat has a signaled seat occupancy, the radio device is a vehicle-external radio device, and the distance to the interior antenna is not uniform or concentric about the interior antenna, but depends on a directivity or an antenna characteristic of the interior antenna.

2. The method according to claim 1, further comprising:

switching to a transmission path by a corresponding switch of the transmission path when the vehicle seat is within a predetermined safety distance of the interior antenna, wherein the control device feeds the transmission power into an additional interior antenna which is different from the interior antenna in the transmission path, and the vehicle seat is out of the predetermined safety distance of the additional interior antenna.

3. The method according to claim 1, further comprising controlling the transmission power by adjusting a transmission amplifier associated with the interior antenna.

4. The method according to claim 1, further comprising controlling the transmission power by an associated insertion of an attenuator associated with the interior antenna.

5. The method according to claim 1, further comprising:

transmitting, by the seat occupancy sensor of the control device or an on-board computer of the motor vehicle, the occupancy signal to a transmitting device of the control device; and determining, by the transmitting device of the control device, to feed a transmission signal into the interior antenna.

6. The method according to claim 1, further comprising adjusting the transmission power as a function of an associated occupancy signal, wherein the associated occupancy signal is determined in a calibration step based on a measurement of an electromagnetic field strength at the vehicle seat.

7. The method according to claim 1, wherein the interior antenna is capable of functioning as a Bluetooth antenna and a WLAN antenna and a mobile antenna.

8. A control device of a motor vehicle comprising a seat occupancy sensor, wherein the control device is designed to control a transmission power on an antenna of the motor vehicle and is configured to:

determine an occupancy signal of a vehicle seat based on a seat occupancy;

control the transmission power at the antenna in accordance with the occupancy signal; and reduce the transmission power at the antenna stepwise or continuously as a function of a distance between the vehicle seat or a position of the vehicle seat and the antenna, wherein the vehicle seat has a signaled seat occupancy, the antenna is an interior antenna, the radio device is a vehicle-external radio device, and the distance to the antenna is not uniform or concentric about the antenna, but depends on a directivity or an antenna characteristic of the antenna.

9. A motor vehicle having a control device comprising a seat occupancy sensor, wherein the control device is designed to control a transmission power on an antenna of the motor vehicle and is configured to:

determine an occupancy signal of a vehicle seat based on a seat occupancy;

control the transmission power at the antenna in accordance with the occupancy signal; and reduce the transmission power at the antenna stepwise or continuously as a function of a distance between the vehicle seat or a position of the vehicle seat and the antenna, wherein the vehicle seat has a signaled seat occupancy, the antenna is an interior antenna, the radio device is a vehicle-external radio device, and the distance to the antenna is not uniform or concentric about the antenna, but depends on a directivity or an antenna characteristic of the antenna.

* * * * *